US012790185B2

(12) United States Patent
Teja

(10) Patent No.: US 12,790,185 B2
(45) Date of Patent: Nov. 10, 2026

(54) HITCH ASSEMBLY AND ASSOCIATED METHOD OF USING THE SAME

(71) Applicant: Jose Teja, Holland, MI (US)

(72) Inventor: Jose Teja, Holland, MI (US)

(*) Notice: Subject to any disclaimer, the term of this patent is extended or adjusted under 35 U.S.C. 154(b) by 246 days.

(21) Appl. No.: 18/760,607

(22) Filed: Jul. 1, 2024

(65) Prior Publication Data

US 2026/0001749 A1 Jan. 1, 2026

(51) Int. Cl.

*B66D 1/28* (2006.01)
*B60D 1/58* (2006.01)
*B66D 1/60* (2006.01)
*B66D 1/04* (2006.01)

(52) U.S. Cl.

CPC ................. *B66D 1/28* (2013.01); *B60D 1/58* (2013.01); *B66D 1/60* (2013.01); *B66D 1/04* (2013.01)

(58) Field of Classification Search

CPC ... B66D 1/04; B66D 1/28; B66D 1/58; B66D 1/60
USPC .......................................................... 414/506
See application file for complete search history.

(56) References Cited

U.S. PATENT DOCUMENTS 3,149,735 A * 9/1964 Bleecker ............... B60P 3/1033 414/506
3,540,610 A * 11/1970 Pontani ................. B60P 3/1033 414/458
3,856,168 A * 12/1974 Mauck .................. B60P 3/1058 414/478
4,420,169 A 12/1983 Taylor
4,466,632 A 8/1984 DeVorak
4,560,184 A 12/1985 Williams, Jr.
4,560,316 A * 12/1985 Daniels ..................... B60P 3/06 410/2
4,807,899 A * 2/1989 Belcher .................... B60D 1/38 280/479.2
5,085,408 A * 2/1992 Norton ..................... B60D 1/38 280/477
5,277,446 A * 1/1994 Hamel ..................... B60D 1/38 280/479.3
D346,772 S 5/1994 Godbersen
5,405,160 A * 4/1995 Weaver .................... B60D 1/38 280/480
D358,570 S 5/1995 Doherty et al.
5,431,423 A * 7/1995 Moreland, Sr. ...... B62D 63/061 280/80.1
5,476,280 A * 12/1995 MacMullan ........... B60D 1/185 242/379.2
5,653,566 A * 8/1997 Williams .................. B60P 3/10 414/800
D390,814 S 2/1998 Weinacht
5,806,737 A * 9/1998 Clark ........................ B60R 9/06 224/527
D403,276 S 12/1998 Neault et al.
5,882,029 A 3/1999 Kennedy (Continued)

FOREIGN PATENT DOCUMENTS

EP 2 092 536 12/2007

*Primary Examiner* — Terrell H Matthews
(74) *Attorney, Agent, or Firm* — King & Partners, PLC

(57) ABSTRACT

A hitch assembly, including: (a) a frame sub-assembly; (b) a winch sub-assembly, wherein the winch sub-assembly is associated with the frame sub-assembly; and (c) wherein the hitch assembly is adapted to enable a user to safely and controllably launch and retrieve a watercraft without risking submersion damage to the user's vehicle.

20 Claims, 8 Drawing Sheets

(56) References Cited

U.S. PATENT DOCUMENTS

| | | | | | |
|---|---|---|---|---|---|
| 5,913,507 | A * | 6/1999 | Lauricella, Jr. | B66D 1/04 | 254/327 |
| 6,086,083 | A * | 7/2000 | Wilks | B60D 1/36 | 280/511 |
| D461,747 | S | 8/2002 | Martin | | |
| 7,497,457 | B2 | 3/2009 | Jamieson | | |
| 9,744,820 | B1 * | 8/2017 | Robins | B60D 1/06 | |
| 10,583,768 | B2 * | 3/2020 | Thorley | B60P 1/00 | |
| 12,179,528 | B1 * | 12/2024 | Wilson | B60D 1/06 | |
| 2018/0092285 | A1 * | 4/2018 | Centerbar | A01B 59/062 | |
| 2018/0222262 | A1 * | 8/2018 | Vetkos | B60D 1/185 | |
| 2018/0281658 | A1 * | 10/2018 | Thorley | B60P 3/1075 | |
| 2024/0151528 | A1 * | 5/2024 | Curless | B63H 7/02 | |

* cited by examiner

HITCH ASSEMBLY AND ASSOCIATED METHOD OF USING THE SAME

COPYRIGHT NOTICE

This application includes material that is subject to copyright protection. The copyright owner has no objection to the facsimile reproduction by anyone of the patent disclosure, as it appears in the United States Patent and Trademark Office files or records, but otherwise reserves all copyright rights whatsoever.

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to hitch assemblies and, more particularly, to hitch assemblies that enable a user to safely and controllably launch and/or retrieve a watercraft (e.g., personal watercraft, boat, sailboat, inflatable, etcetera) without risking submersion damage to the user's vehicle (e.g., electric vehicle, hybrid car, combustion engine vehicle, etcetera) during normal operation of the same. The present invention further relates to methods of using the hitch assemblies of the present invention.

Many people are transitioning away from large, gas guzzling trucks and/or vehicles which pollute the air, and, instead, are purchasing environmentally friendly, small electric vehicles and/or hybrid cars. One downside to these types of vehicles is that they have a lower ground clearance than trucks which can be problematic when launching and/or retrieving a watercraft at a boat launch. In particular, both the air intake and exhaust for small hybrid vehicles can be very close to the ground making it virtually impossible to back a trailer into the water without risking submersion damage. Electric vehicles are even more difficult to launch watercraft because their batteries are typically positioned at the bottom of the vehicle which presents a fire/explosion hazard. Moreover, most small electric vehicles and/or hybrid cars have small tires that do not have sufficient traction for launching watercraft-especially when the boat launch asphalt and/or concrete develops a thin, slippery algae film. The hitch assembly of the present invention enables a user of a small electric vehicle and/or hybrid car to safely and controllably launch and/or retrieve a watercraft without risking submersion damage to the user's vehicle.

These and other objects of the present invention will become apparent in light of the present specification, claims, and drawings.

2. Background Art

Watercraft launch assemblies and hitch apparatuses have been known in the art for years and are the subject of a plurality of patents and publications, including: U.S. Pat. No. 10,583,768 entitled "Watercraft Launch and Loading Systems and Methods," U.S. Pat. No. 7,497,457 entitled "Trailer Towing System," U.S. Pat. No. 5,882,029 entitled "Trailer Hitch Alignment and Lifting Device," U.S. Pat. No. 5,476,280 entitled "Retractable Towing System," U.S. Pat. No. 5,085,408 entitled "Trailer Connecting Guide," U.S. Pat. No. 4,807,899 entitled "Hitch Assembly," U.S. Pat. No. 4,560,184 entitled "Trailer Hitch," U.S. Pat. No. 4,466,632 entitled "Trailer Hitch Having a Winch Coupling Assist," U.S. Pat. No. 4,420,169 entitled "Trailer Hitch," and United Kingdom Patent Number 2,092,536 entitled "Trailer Vehicle Winching Apparatus"-all of which are hereby incorporated herein by reference in their entirety including all references cited therein.

U.S. Pat. No. 10,583,768 appears to disclose systems and methods for aiding in the launching and/or loading of a watercraft on a mobile trailer. Various embodiments provide for an aid system that may be removably installed without significant modifications to a trailer. In some embodiments, the aid system may include one or more guide straps that are elastic, at least in part, to facilitate the guiding and positioning of a watercraft and/or associated winch hook assembly during launching and/or loading operations. Further embodiments may ease launching operations by providing a certain measure of force propelling the watercraft from the mobile trailer into the water, and/or ease loading operations by positioning the winch hook assembly towards a rear of the mobile trailer during loading operations.

U.S. Pat. No. 7,497,457 appears to disclose an accessory towing apparatus that connects a towing vehicle to a gooseneck type trailer. The accessory towing apparatus includes a chassis assembly mounted on an axle having two ground-engaging wheels. The chassis assembly includes two linkage arms, which are attached to and extend from the axle. The ends of the two linkage arms are designed to engage two brackets attached to the main frame of the towing vehicle. The linkage arms may further include a pivot point near the axle attachment point that permits the arms to pivot and spread away from one another in order to facilitate the engagement of the linkage arms in their respective brackets. A novel clamping lever system may also be utilized to secure the two linkage arms into their respective brackets. An automatic alignment and attachment system may also be included to greatly simplify the attachment process of the gooseneck type trailer to the towing vehicle.

U.S. Pat. No. 5,882,029 appears to disclose a device for aligning the tongue and hitch first portion on a trailer (trailer hitch) with the receiver and hitch second portion (ball) on a towing vehicle, and for lifting the trailer hitch on and off the ball. The device comprises a vertical post on the towing vehicle in front of and in close proximity to the ball. The post has a pivotal arm which can rotate from a vertical position to a rearwardly inclined position. The post has a cable guide at or near its top surface. The pivotal arm also has a cable guide at or near its top surface. The cable guides are for receiving and guiding a cable connected to a winch on the tongue of the trailer. The tongue of the trailer also has a cable guide in front of the winch near the front end of the tongue. The invention has two modes of operation: (1) on-loading the trailer hitch onto the ball; and (2) off-loading the trailer hitch from the ball. During on-loading, slack cable from the winch is directed through the tongue cable guide, over the pivotal arm cable guide, over the post cable guide and is connected to a cable hook receiver low on the post. During off-loading, the post cable guide is not utilized and the cable passes from the winch, through the tongue cable guide, over the pivotal arm cable guide and is connected to the cable hook receiver or to the vehicle.

U.S. Pat. No. 5,476,280 appears to disclose a retractable towing system which is mounted on the undercarriage of a vehicle, with the towline extending beneath the vehicle, secured at a secondary stress-bearing point near the rear of the towing vehicle, and attached to the object or vehicle to be pulled or towed.

U.S. Pat. No. 5,085,408 appears to disclose a trailer connecting guide for use with a boat trailer or the like. The trailer connecting guide is attached to one side of the tongue of the trailer and is operable to guide the trailer sufficiently close to the tow vehicle to complete the connection. The trailer connecting guide assembly includes a pulley, a mounting bolt, and a winch cable guide. The cable guide is mounted between the pulley and trailer tongue and includes at least one elongated slot adjacent to the pulley track which restricts the lateral movement of the winch cable with respect to the pulley track to prevent the winch cable from pumping out of the pulley track. In operation, a length of cable is first let off the winch and the end of the winch cable is attached to the towing vehicle adjacent the vehicle hitch. A portion of the cable is then slipped around the pulley and guide assembly and any excess slack in the cable is taken up by operation of the winch. Then, as the winch continues to be operated, the trailer tongue and vehicle hitch are brought together sufficiently close to permit the connection to be completed.

U.S. Pat. No. 4,807,899 appears to disclose a hitch assembly for use with a tow vehicle which includes a receiver defining a tubular passage way mounted on the rear of the vehicle in longitudinal alignment, a winch extending a retractable cable rearward through said passage way, and a hitch bar connectable to the end of the cable as well as to the hitch fixture of the towed element, whereby the cable can be retracted to draw the hitch bar up within the receiver passage way with the towed element aligned and the hitch connection locked.

U.S. Pat. No. 4,560,184 appears to disclose an automatic trailer hitch assembly mounts a shank unit on the trailer and a receiving unit on the towing vehicle. The shank unit provides an elongated shank member which mounts a trailer ball at one end coupled to a conventional trailer hitch ball socket housing secured to the trailer and at the opposite end is formed to slide on funnel-like guide passages into the receiving unit. The receiving unit has a locking pin which can be latched into a position allowing entry of the shank member into the receiving unit and when the shank unit is properly positioned therein is automatically unlatched and moved into a position for locking the shank unit and receiving unit together. The locking pin when restored to the latched position enables the shank unit to be withdrawn from the receiving unit.

U.S. Pat. No. 4,466,632 appears to disclose a highway trailer hitch having a trailer connector secured to one end of a cable with the other end of the cable extending through a guide and support sleeve and mounted on a cable drum. A crank powers the cable drum to reel in cable and the attached trailer connector to provide a coupling assist for connecting a trailing vehicle to a towing vehicle.

U.S. Pat. No. 4,420,169 appears to disclose a trailer hitch attachment mounting between a towing vehicle and a trailer for simulating a "5th" wheel trailer hookup. The hitch mounts to the towing vehicle undercarriage rearwardly adjacent the rear axle and includes a drawbar that extends to the towing tongue of the trailer. The drawbar is pivoted at a front end about a primary axis directly behind the rear axle and at a rearward end, about a secondary axis at the connection to the trailer towing tongue. A lockout mechanism is provided for alternately locking the drawbar against pivotal motion about one or the other the pivot axes, so only pivotal motion will be allowed about only one axis at any given time. The pivot axes are alternated according to relative angular movement of the towing vehicle relative to the trailer.

United Kingdom Patent Number 2,092,536 appears to disclose a winch that provides means of drawing a towing vehicle and a trailer vehicle, together reducing the amount of physical effort required and guiding the two parts of the vehicle coupling together. The winch is mounted immediately beneath the towing fitting and is attached either permanently or detachably to a backplate which is bolted to the towbar of the towing vehicle. A cable or rope is fed outwards from the winch and attached to the drawbar of the trailer vehicle centrally, so that when the winch is operated, the cable draws the trailer and towing vehicles together, positioning the two parts of the coupling ready for the coupling together to be completed easily. The coupling may be a ball-and-socket coupling or a pin-and-clevis coupling.

While the above-identified patents and publications do appear to disclose various watercraft launch assemblies and hitch apparatuses, their configurations remain non-desirous and/or problematic inasmuch as, among other things, none of the above-identified disclosures enable a user to safely and controllably launch and/or retrieve a watercraft, as is disclosed herein, without risking submersion damage to the user's vehicle.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a hitch assembly, comprising, consisting essentially of, and/or consisting of: (a) a frame sub-assembly; (b) a winch sub-assembly, wherein the winch sub-assembly is associated with the frame sub-assembly; and (c) wherein the hitch assembly is adapted to enable a user to safely and controllably launch and retrieve a watercraft without risking submersion damage to the user's vehicle.

The present invention is also directed to a hitch assembly, comprising, consisting essentially of, and/or consisting of: (a) a frame sub-assembly, wherein the frame sub-assembly includes a first segment that is adapted for releasable securement to a car, a second segment that is adapted for releasable securement to a watercraft trailer, at least one enclosed loop adapted for releasable securement with a safety cord, a third segment that is adapted to retain a winch sub-assembly, and a fourth segment that is adapted to guide a strap from the winch sub-assembly; and (b) a winch sub-assembly, wherein the winch sub-assembly is associated with the frame sub-assembly.

The present invention is further directed to a method for using a hitch assembly, comprising, consisting essentially of and/or consisting of the steps of: (a) providing the hitch assembly comprising a frame sub-assembly and a winch sub-assembly, wherein the winch sub-assembly is associated with the frame sub-assembly and wherein the hitch assembly is adapted to enable a user to safely and controllably launch and retrieve a watercraft without risking submersion damage to the user's vehicle; (b) securing a first component of the frame sub-assembly to the user's vehicle; (c) securing a second component of the frame sub-assembly to a watercraft trailer; (d) securing a strap from the winch sub-assembly to a watercraft; (e) positioning the user's vehicle such that the watercraft on the watercraft trailer is proximate a body of water; (f) unwinding the winch strap so that the watercraft can be lowered into the water; and (g) release the winch strap from the watercraft.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
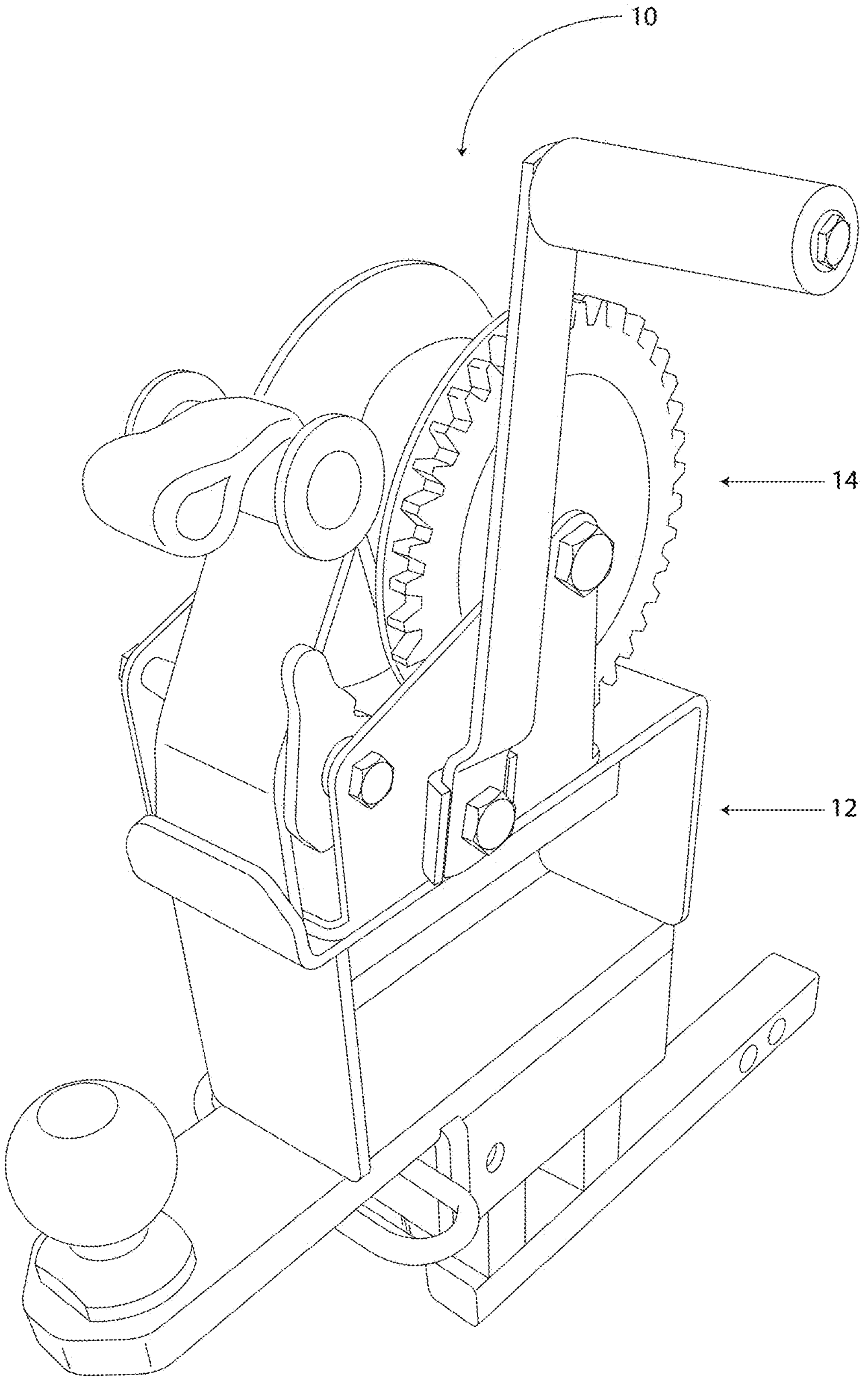
Figure 2:
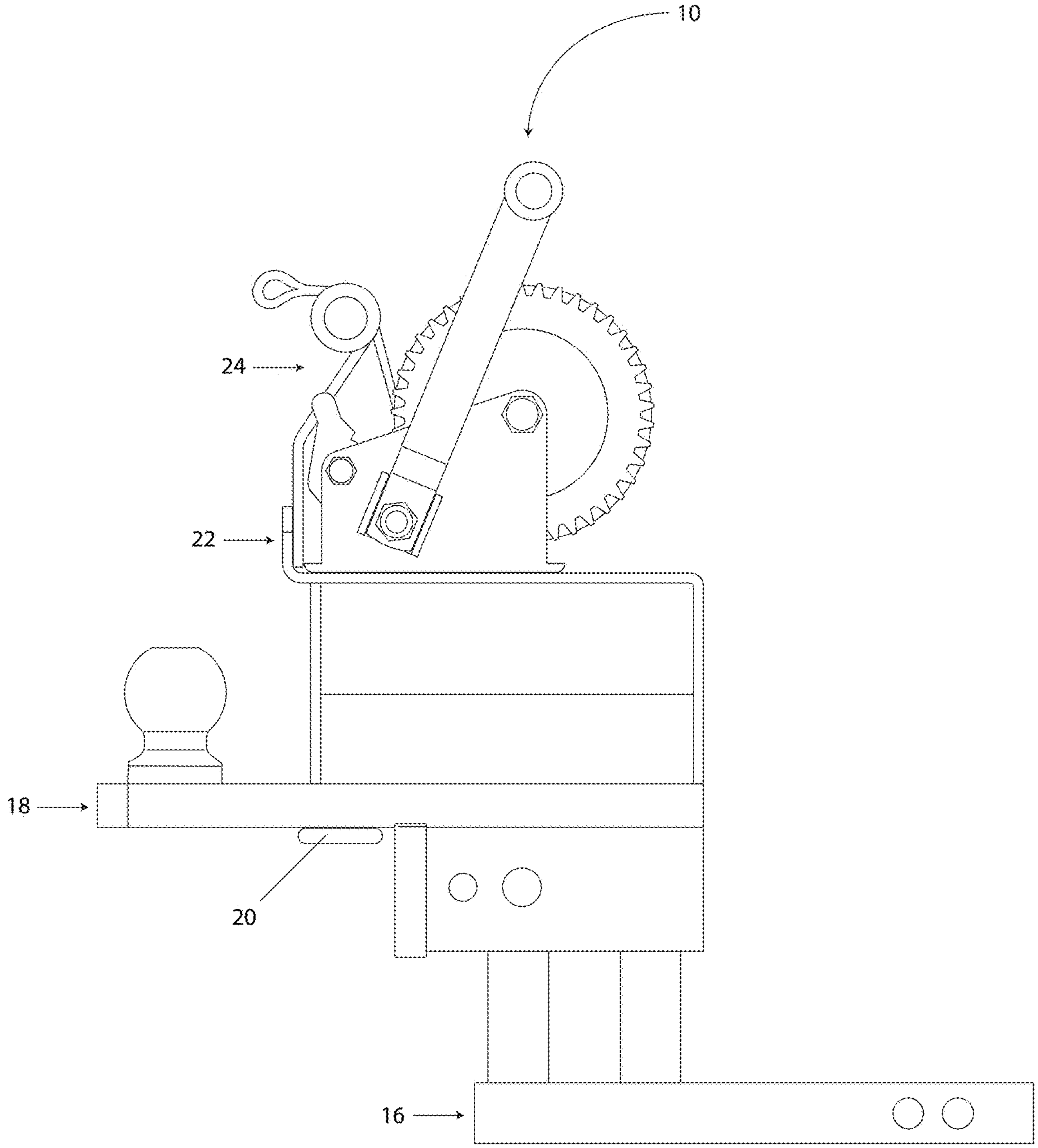
Figure 3:
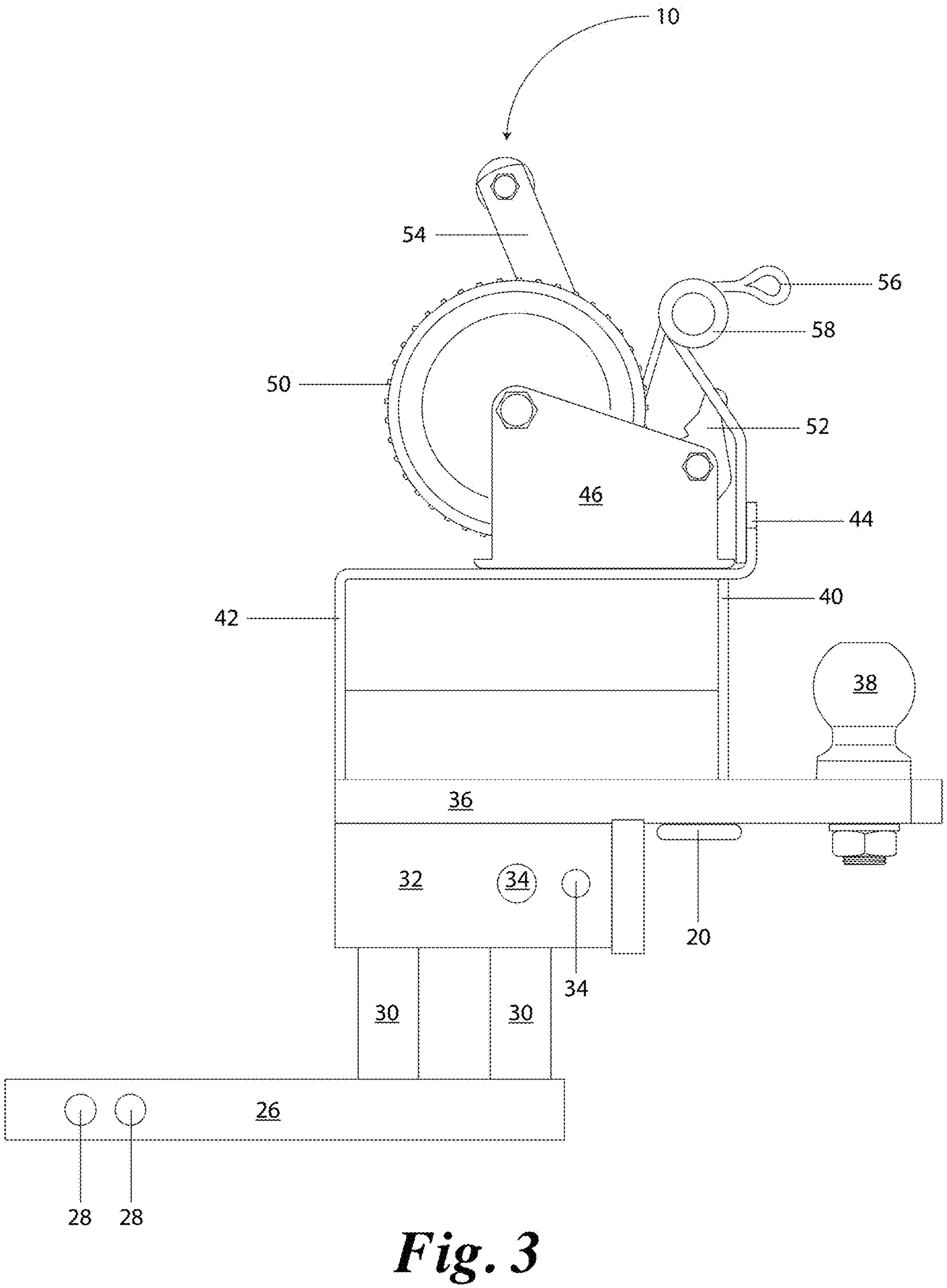
Figure 4:
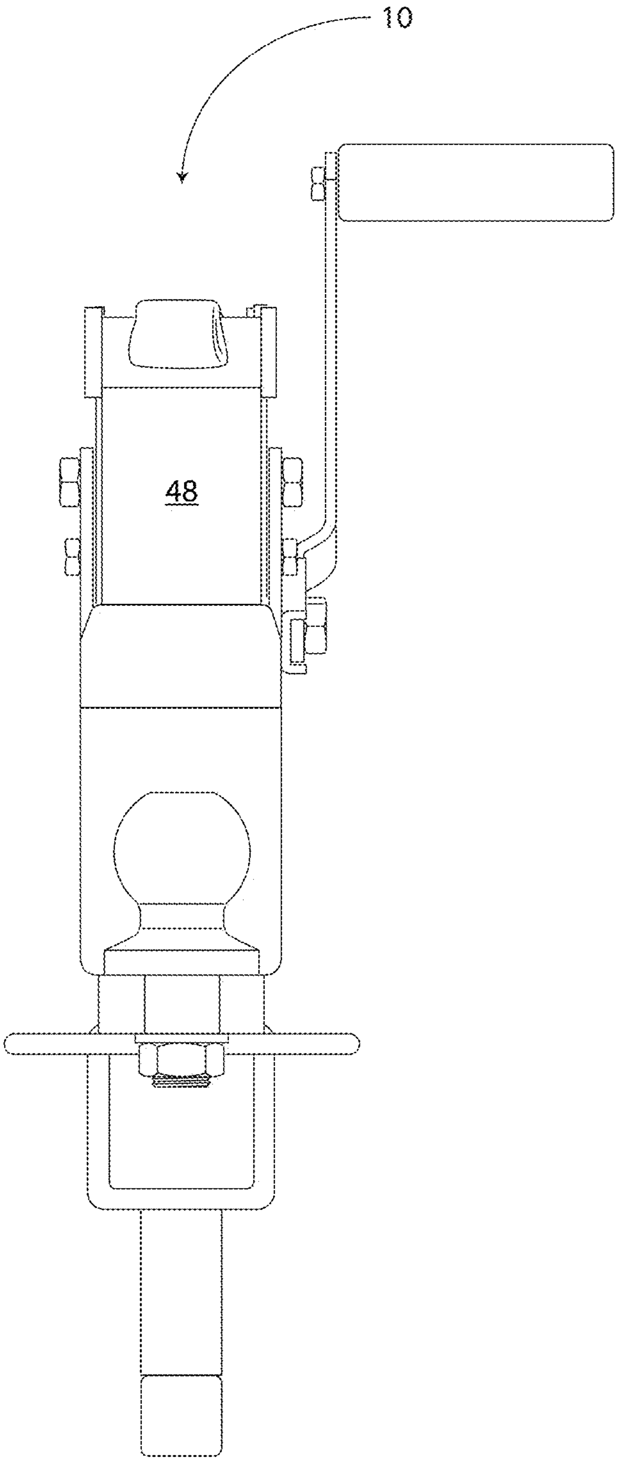
Figure 5:
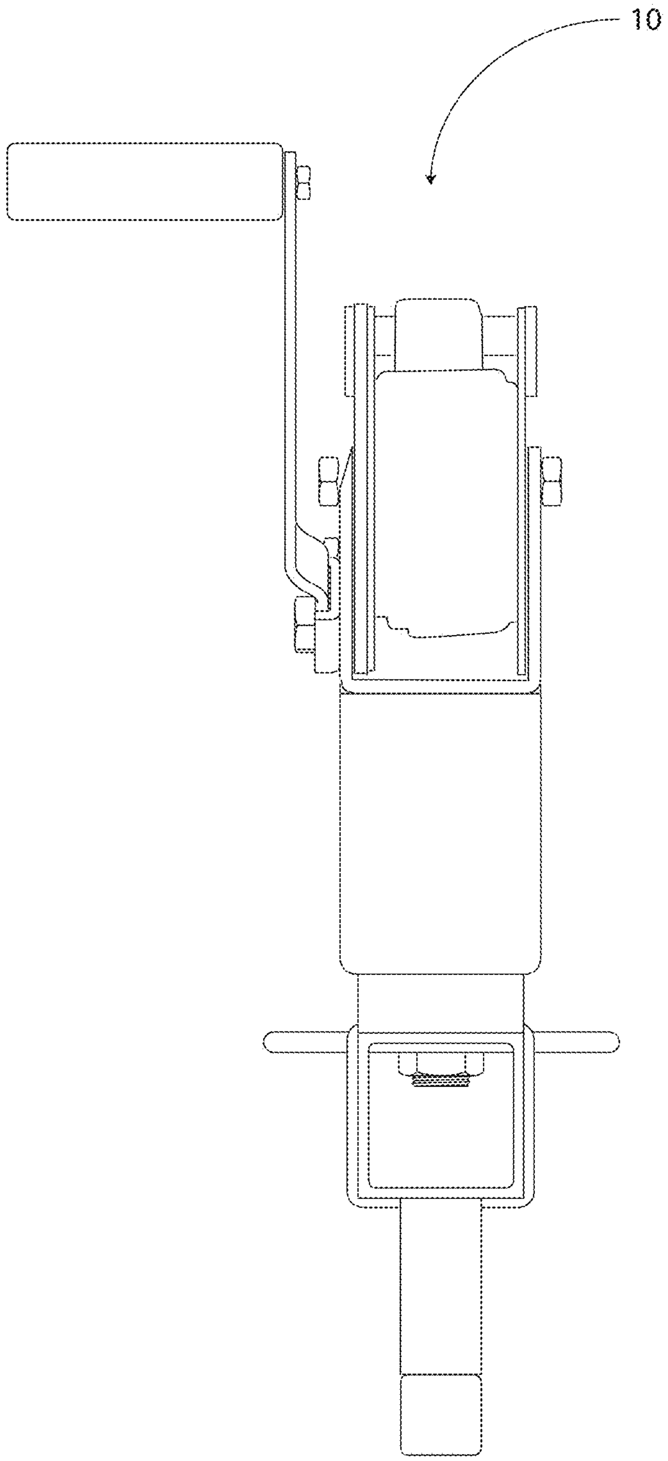
Figure 6:
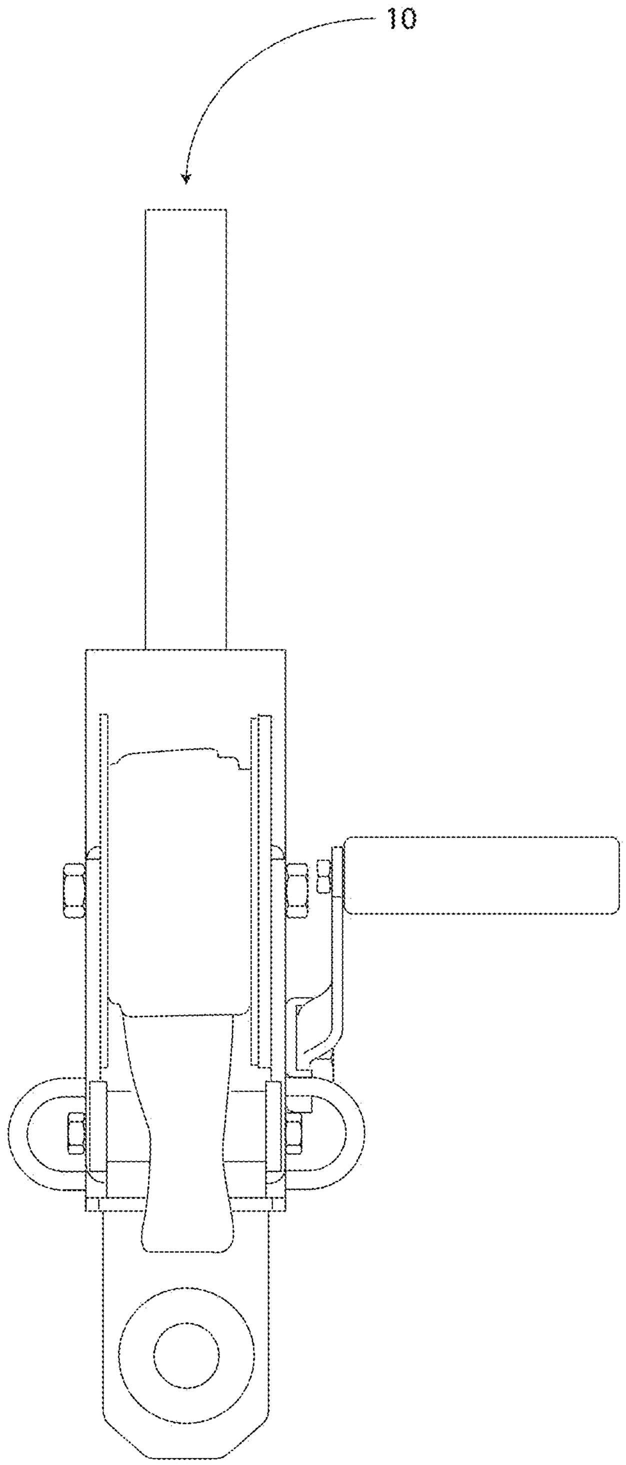
Figure 7:
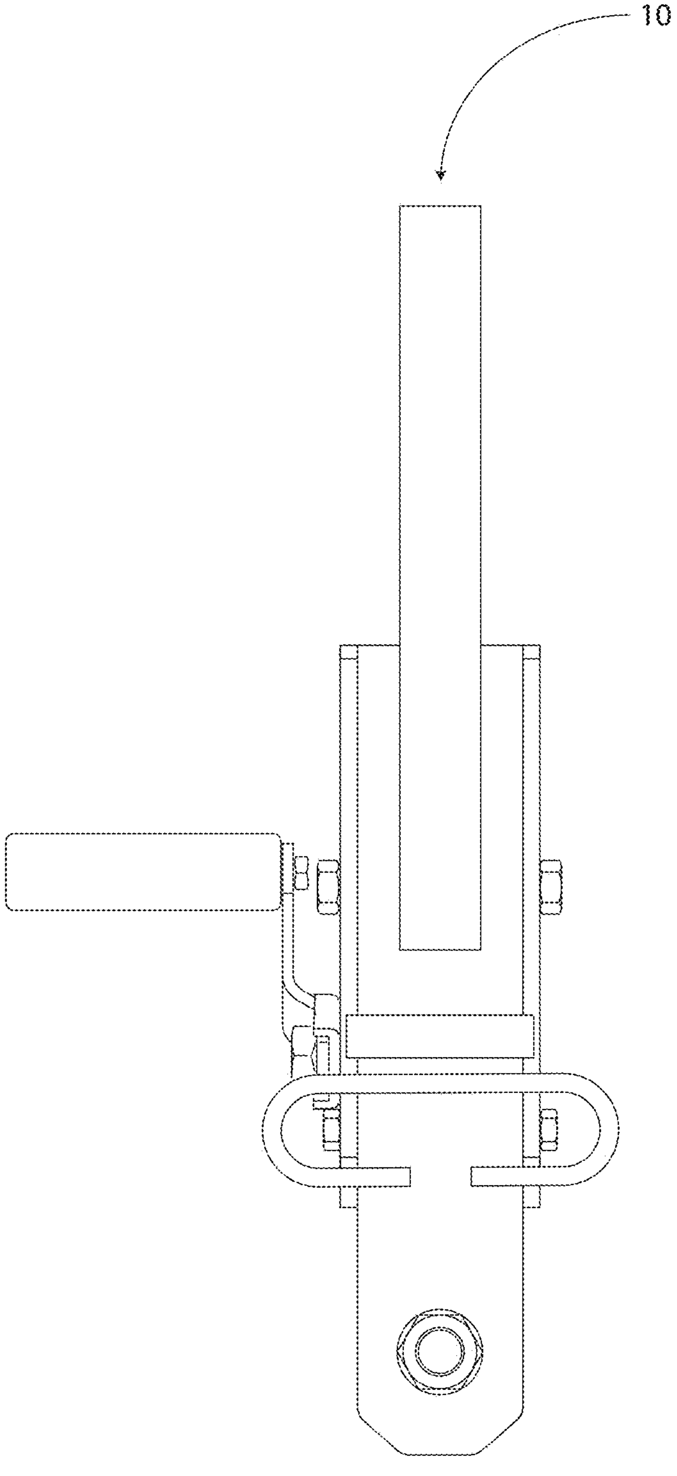

The invention will now be described with reference to the drawings wherein:

FIG. 1 is a perspective view of a hitch assembly fabricated in accordance with the present invention;

FIG. 2 is a left side view of the hitch assembly of FIG. 1;

FIG. 3 is a right side view of the hitch assembly of FIG. 1;

FIG. 4 is a front view of the hitch assembly of FIG. 1;

FIG. 5 is a rear view of the hitch assembly of FIG. 1;

FIG. 6 is a top view of the hitch assembly of FIG. 1;

FIG. 7 is a bottom view of the hitch assembly of FIG. 1; and

Figure 8:
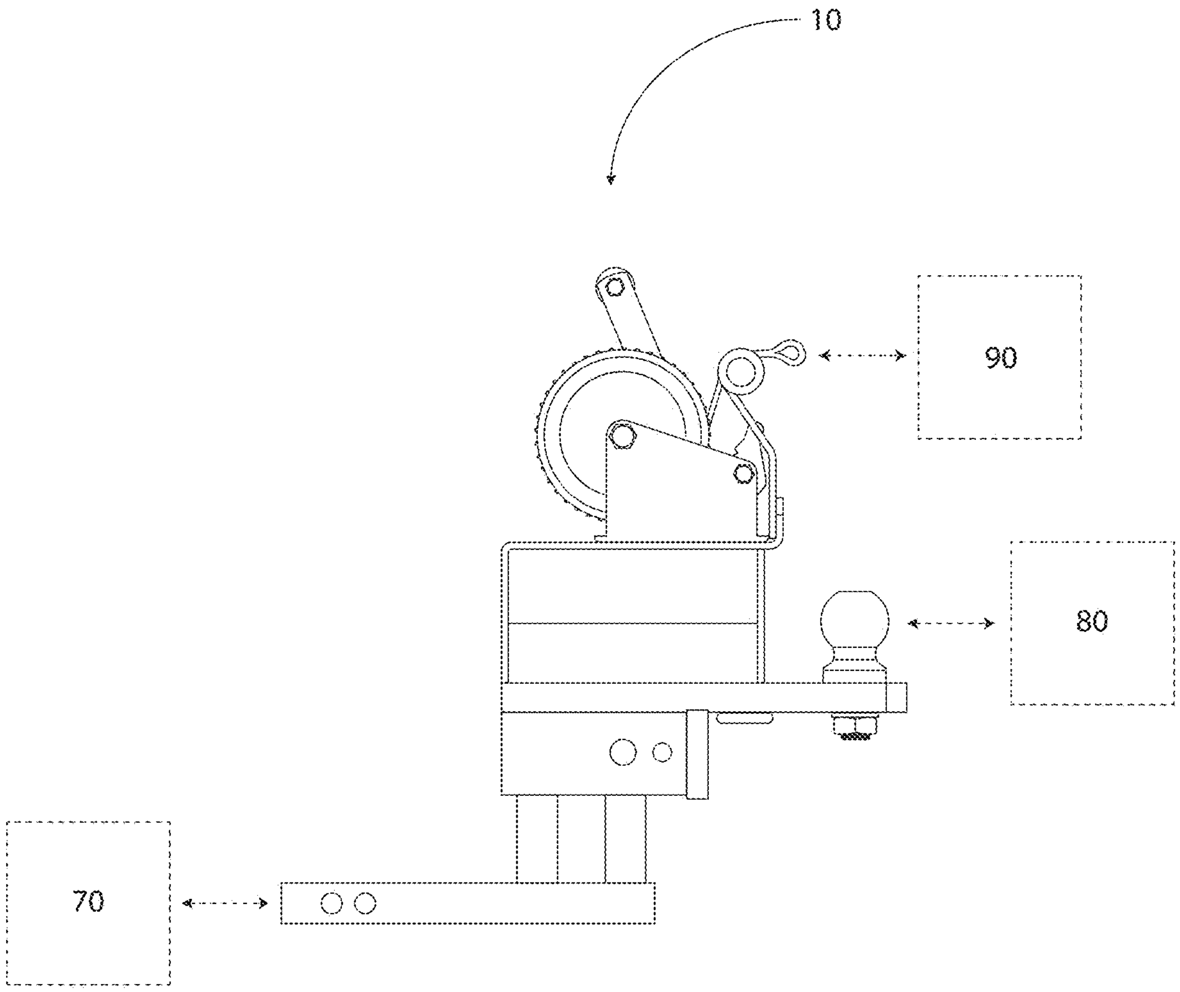

FIG. 8 is a schematic representation showing the hitch assembly of the present invention associated with a vehicle, a watercraft trailer, and a watercraft.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Referring now to the collective drawings, and to FIGS. 1-7 in particular, hitch assembly/apparatus 10, is shown as generally comprising frame sub-assembly 12, and winch sub-assembly 14. Hitch assembly 10 of the present invention is adapted to enable a user to safely and controllably launch and retrieve a watercraft without risking submersion damage to the user's vehicle.

Frame sub-assembly 12 preferably includes first segment 16 that is adapted for releasable securement to a car, second segment 18 that is adapted for releasable securement to a watercraft trailer, loops 20 that are adapted for releasable securement with a safety cord, third segment 22 that is adapted to retain a winch sub-assembly, and fourth segment 24 that is adapted to guide a strap from the winch sub-assembly. Preferably, frame sub-assembly 12 includes lower horizontal support member 26 having apertures 28, vertical support members 30, secondary horizontal support member 32 having apertures 34, tertiary horizontal support member 36 having ball 38 secured thereto, secondary vertical support member 40, L-shaped bracket 42 having lip 44.

Winch sub-assembly 14 is secured to frame sub-assembly 12 and includes mounting base/plates 46, strap drum 48, sprocket/gear 50, ratchet switch pawl 52, crank handle 54, strap 56, strap guide 58. It will be understood that winch sub-assembly 14 may also include an electric winch with or without a handle. It will be further understood that, while shown, standard assembly components, such as nuts and bolts have not been numbered to avoid unnecessarily cluttering the drawings.

Referring now to FIG. 8, and in operation, the present invention include a method for using hitch assembly 10, comprising the steps of: (a) providing the hitch assembly comprising a frame sub-assembly and a winch sub-assembly, wherein the winch sub-assembly is associated with the frame sub-assembly and wherein the hitch assembly is adapted to enable a user to safely and controllably launch and retrieve a watercraft without risking submersion damage to the user's vehicle; (b) securing a first component of the frame sub-assembly to user's vehicle 70; (c) securing a second component of the frame sub-assembly to watercraft trailer 80; (d) securing a strap from the winch sub-assembly to watercraft 90; (e) positioning the user's vehicle such that the watercraft on the watercraft trailer is proximate a body of water; (f) unwinding the winch strap so that the watercraft can be lowered into the water; and (g) releasing the winch strap from the watercraft.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as “up to,” “at least,” “greater than,” “less than,” and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A hitch assembly, comprising:

a frame sub-assembly, wherein the frame sub-assembly includes a first segment that is configured for releasable securement to a vehicle, a second segment that is configured for releasable securement to a watercraft trailer, at least one enclosed loop configured for releasable securement with a safety cord, and a third segment, wherein:

the first segment comprises a lower horizontal support member dimensioned to be telescopically received within a receiver tube of a hitch receiver of the vehicle, the lower horizontal support member having at least one aperture extending therethrough and configured to receive a hitch pin;

the frame sub-assembly further includes at least one vertical support member extending upwardly from the lower horizontal support member; and the second segment comprises a horizontal support member positioned vertically above the lower horizontal support member, and a hitch ball secured to an upper surface of the horizontal support member, the hitch ball being configured for releasable securement to a coupler of the watercraft trailer;

a winch sub-assembly, wherein the winch sub-assembly is retained by the third segment of the frame sub-assembly vertically above the second segment, the winch sub-assembly including a strap drum and a strap windable about the strap drum; and a strap guide positioned above the hitch ball, wherein the strap extends from the strap drum and through the strap guide such that, upon unwinding of the strap from the strap drum, the strap is extendable over the hitch ball and toward a watercraft supported upon the watercraft trailer.

2. A hitch assembly, comprising:

a frame sub-assembly, wherein the frame sub-assembly includes:

a lower horizontal support member having a pair of apertures extending therethrough, the lower horizontal support member being dimensioned to be telescopically received within a receiver tube of a hitch receiver of a vehicle and configured to be releasably secured within the receiver tube via a hitch pin received through at least one of the pair of apertures;

a plurality of vertical support members extending upwardly from the lower horizontal support member;

a secondary horizontal support member supported by the plurality of vertical support members;

a tertiary horizontal support member positioned above the secondary horizontal support member;

a hitch ball secured to the tertiary horizontal support member, the hitch ball being configured for releasable securement to a coupler of a watercraft trailer; and a secondary vertical support member extending upwardly relative to the tertiary horizontal support member; and a winch sub-assembly, wherein the winch sub-assembly is secured to the frame sub-assembly above the hitch ball and includes a strap drum, a strap windable about the strap drum, and a strap guide, the strap guide being positioned above the hitch ball and the strap extending from the strap drum through the strap guide.

3. A method for using a hitch assembly, comprising the steps of:

providing the hitch assembly comprising a frame sub-assembly and a winch sub-assembly, wherein the winch sub-assembly is retained by the frame sub-assembly and includes a strap drum and a strap, wherein the frame sub-assembly includes a lower horizontal support member and a hitch ball positioned vertically above the lower horizontal support member, and wherein the strap extends from the strap drum through a strap guide positioned above the hitch ball;

securing the lower horizontal support member of the frame sub-assembly within a receiver tube of a hitch receiver of a user’s vehicle;

releasably securing a coupler of a watercraft trailer to the hitch ball of the frame sub-assembly;

securing the strap from the winch sub-assembly to a watercraft supported upon the watercraft trailer;

positioning the user’s vehicle such that the watercraft on the watercraft trailer is proximate a body of water;

unwinding the winch strap from the strap drum, while the coupler of the watercraft trailer remains releasably secured to the hitch ball and while the user’s vehicle remains out of the body of water, such that the watercraft travels off of the watercraft trailer and is lowered into the body of water; and releasing the strap from the watercraft.

4. The hitch assembly of claim 1, wherein the at least one aperture comprises a pair of apertures extending through the lower horizontal support member.

5. The hitch assembly of claim 1, wherein the at least one vertical support member comprises a plurality of vertical support members extending upwardly from the lower horizontal support member.

6. The hitch assembly of claim 5, wherein the frame sub-assembly further includes a secondary horizontal support member supported by the plurality of vertical support members and positioned vertically between the lower horizontal support member and the horizontal support member of the second segment.

7. The hitch assembly of claim 6, wherein the secondary horizontal support member includes at least one aperture extending therethrough.

8. The hitch assembly of claim 1, wherein the at least one enclosed loop depends downwardly from the second segment.

9. The hitch assembly of claim 8, wherein the at least one enclosed loop is positioned between the hitch ball and the at least one vertical support member.

10. The hitch assembly of claim 1, wherein the third segment comprises an L-shaped bracket having a lip.

11. The hitch assembly of claim 1, wherein the winch sub-assembly further includes a mounting base secured to the frame sub-assembly, a sprocket gear coupled to the strap drum, a ratchet switch pawl engageable with the sprocket gear, and a crank handle.

12. The hitch assembly of claim 1, wherein the winch sub-assembly comprises an electric winch.

13. The hitch assembly of claim 2, further comprising at least one enclosed loop depending downwardly from the tertiary horizontal support member, the at least one enclosed loop being configured for releasable securement with a safety cord.

14. The hitch assembly of claim 2, wherein the lower horizontal support member extends from the plurality of vertical support members to a distal end, the pair of apertures being positioned proximate the distal end, and wherein the hitch ball is positioned on a side of the plurality of vertical support members opposite the distal end.

15. The hitch assembly of claim 2, wherein the winch sub-assembly further includes a sprocket gear coupled to the strap drum, a ratchet switch pawl engageable with the sprocket gear, and a crank handle.

16. The method of claim 3, wherein the step of securing the lower horizontal support member within the receiver tube comprises inserting a hitch pin through at least one aperture extending through the lower horizontal support member.

17. The method of claim 3, further comprising the step of releasably securing a safety cord to at least one enclosed loop of the frame sub-assembly.

18. The method of claim 3, wherein the winch sub-assembly further includes a sprocket gear coupled to the strap drum, a ratchet switch pawl engageable with the sprocket gear, and a crank handle.

19. The method of claim 3, further comprising, after the step of releasing the strap from the watercraft, the steps of securing the strap to the watercraft while the watercraft is in the body of water and winding the strap about the strap drum such that the watercraft is drawn from the body of water onto the watercraft trailer, thereby retrieving the watercraft.

20. The method of claim 3, wherein the user's vehicle comprises an electric vehicle or a hybrid car.

* * * * *